April 13, 1926.
T. F. CURRY
1,580,965
ADJUSTABLE CONTROL FOR GAS VALVE OPERATING MEANS
Filed June 16, 1924
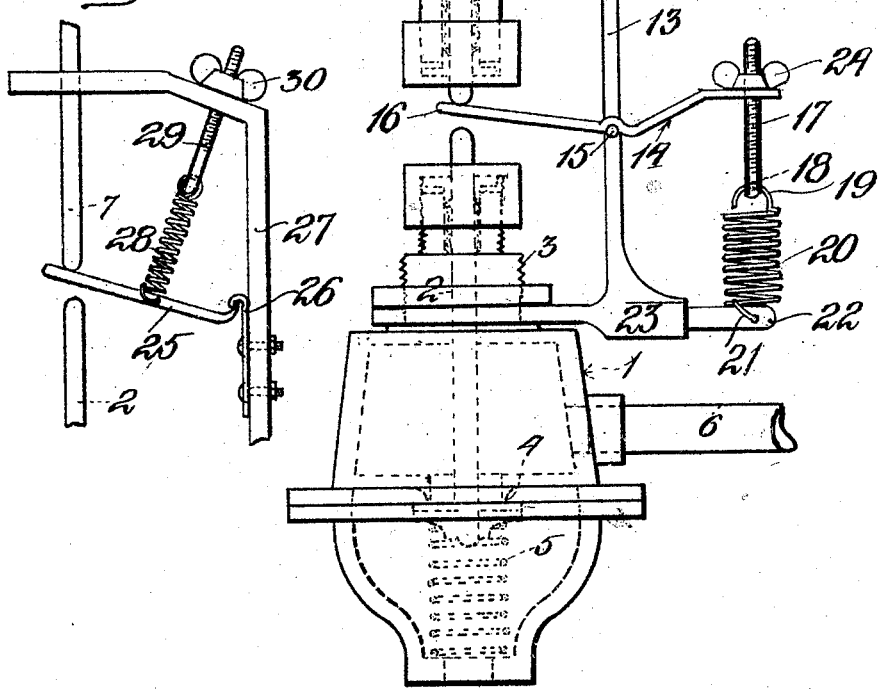
Inventor
Thomas F Curry
by Anton Hochner
his Atty Patented Apr. 13, 1926.

1,580,965

UNITED STATES PATENT OFFICE.

THOMAS F. CURRY, OF LOS ANGELES, CALIFORNIA, ASSIGNOR TO HOYT HEATER COMPANY, OF LOS ANGELES, CALIFORNIA, A CORPORATION OF CALIFORNIA.

ADJUSTABLE CONTROL FOR GAS-VALVE-OPERATING MEANS.

Application filed June 16, 1924. Serial No. 720,468.

*To all whom it may concern:*

Be it known that I, THOMAS F. CURRY, a citizen of the United States, residing at Los Angeles, county of Los Angeles, and State of California, have invented a certain new and useful Adjustable Control for Gas-Valve-Operating Means, of which the following is a specification.

This invention relates to a means for use in connection with hydrostatic gas-valve-operating means, usually associated with instantaneous heaters, in governing the movement of such hydrostatic means in accordance with the varying pressures existing in water lines, and it has especial reference to an attachment to a gas valve operating valve or piston by which a tension is imposed upon the valve or piston, which tension must be overcome before a movement of the valve or piston under water pressure is possible to actuate the gas valve.

The invention is applicable, as stated, to instantaneous gas-water heaters, in which a gas valve is controlled by a piston or valve acting under pressure of water when water is drawn through the heater.

When water is drawn from the system, which includes the heater, and is suddenly shut off, the rebound or pulsation of the water in the pipe causes the valve or piston to flutter and operate the gas valve. To prevent the waste and annoyance incident upon this frequent lighting of the gas, a spring has heretofore been interposed in the valve or piston chamber, which, when once assembled with the valve or piston parts, is completely enclosed therein. A spring thus placed is not readily accessible; in any event, replacement or other work made necessary to it must be done by a skilled hand. Furthermore, a spring thus housed, is not adjustable and hence cannot be regulated or modified to meet varying pressures of water. A modification according to pressure requirements necessitates substitution by an entirely new spring and obviously also dismantling the valve or piston chamber. In addition, the springs used in these constructions are constantly in water and the corrosive or chemical action of the water soon impairs their efficiency and makes necessary frequent replacement.

The objects of this invention, therefore, are to avoid these disadvantages and to provide a simple and practical device in which a most delicate adjustment may be made by anyone according to needs; in which any adjustment may be made without interfering with the gas-valve-operating means, and which will prevent all fluttering of the piston or valve which actuates the gas valve; and finally which may constitute a convenient attachment to the gas-valve-controlling means.

The invention is shown in the accompanying drawings in which—

Fig. 1 is a sectional view of the water-operated valve and the gas valve, with the invention as applied thereto, and Fig. 2 is a detail of a modified form of the invention.

Referring to the drawing, a general form of gas valve and the control is shown. The gas valve 1, is provided with a stem 2, which projects beyond the housing 3 and is held projected, with the valve against its seat 4, in the housing 3, by a spring 5. To the valve-housing is connected a gas supply pipe 6.

The gas valve 1 is of usual form and construction and the stem 2 thereof is disposed in operative relation to a stem 7, actuable in a downward direction by a piston 8, which is contained and operates within a chamber 9, by water pressure and which communcates its motion to the stem 2 of the gas-valve 1. The stem 7, within the chamber 9, is in direct alinement with the stem 2 and is spaced therefrom, the spacing under usual conditions being maintained by the means presently referred to. A pipe 10 is connected with the chamber 9 above the piston 8, and another pipe 11 is connected with the chamber below the piston and leads from the chamber to a water heater, not shown. The pipe 10 leads directly from a water-supply pipe 12, while the pipe 11 communicates with the supply pipe through a valve opening 11'. A tapering valve, not shown, enters the pipe 11 on the opposite side of the valve opening through the usual stuffing box provided for such valves and is normally adjusted relative to the valve opening so that the maximum amount of water flowing through the valve opening does not exceed the amount of water the heater can heat to the desired temperature when the gas valve is fully opened.

Whenever water is drawn from the heater, the flow of the water through the reduced valve opening 11' causes a reduction of the pressure in the pipe 11 and, since the chamber 9 below the piston communicates with the pipe 11, the pressure is therefore also reduced below the piston. On the contrary, since the pipe 10 communicates directly with the supply pipe and is of such a size as not to cause a noticeable reduction of the water pressure therein, and since the pipe 10 communicates with the chamber 9 above the piston, the water pressure above the piston, when water is drawn from the heater, will be greater than the water pressure below the piston. Such a difference in pressure forces down the piston and causes the valve stem to be forced into engagement with the gas valve stem 2, which is thereby suddenly unseated, allowing a full flow of gas to the heater burner. When no water is flowing through the water heater, the water pressure in the chamber, below and above the piston, is balanced and provision is made to return the piston 8, or valve where such is used, to normal position, that is, to the top of the chamber, when such balance occurs, this provision also serving to maintain a tension upon the stem 7, which prevents fluttering or quivering of the piston, when water is drawn off at a point in advance of its entry into the heater.

A provision of this type is the subject of the present invention, the foregoing description of the valve and the valve-operating means being made merely to illustrate the adaptation of the invention to a water heater adjunct of common form and use.

By a yoke 13, the gas-valve housing and the piston chamber 9, are interconnected in rigid manner and the stem 2 of the gas valve, and the stem 7 in the chamber 9, are held in accurate, opposed alinement. Upon said yoke 13, is fulcrumed a lever 14, which preferably straddles the yoke and is pivotally movable upon a pin 15, provided on each side of the yoke. One end 16 of the lever 14, extends between the opposed and alined stems 2 and 7, and the other end of said lever 14 is apertured to accommodate a threaded member 17, having an eye 18, for receiving one loop 19 of a spring 20. The other loop 21 of said spring is arranged to be received in an eye provided in an anchor 22, which preferably threads in and projects from a boss or enlarged portion 23 on the yoke. A wing-nut 24, or other means is manipulable on the threaded member 17, to vary the tension of the spring 20, and hence the pressure of the end 16 upon the stem 7, in the chamber 9.

By this means, an adjustment of the spring tension is readily effected in accordance with the requirement made necessary by the varying water pressures which are exerted upon the piston in different localities. This adjustment, as is obvious, in nowise interferes with the assembled units or parts. The device herein described provides for adjustment by unskilled persons; is extraneous to the unit of which it is an adjunct; is not affected by water temperature or climatic action; is proof against dislodgement, and effectively prevents fluttering of the piston.

A like effect is attained by the modified form shown in Fig. 2, in which the fulcrum of the lever 25, and the point of application of power is changed respectively, to the end and center of the lever. The lever 25 is preferably carried at its rear end in a curved bearing 26, which constitutes the fulcrum and which may be adjustably secured to the yoke 27.

Centrally of the lever 25, is attached a spring 28 which is connected to a bar 29, operable by a wing-nut 30, to vary the tension of said spring 28, and control the pressure of the other end of the lever 25 upon the stem 7.

What I claim, is:

1. In a device of the character described, in combination with a gas-valve stem and a stem opposed to said gas-valve stem and operable under hydrostatic pressure, a yoke, a lever fulcrumed thereon, and means for imposing tension upon one end of said lever to cause the other end of said lever to transmit tension to said hydrostatic-pressure-operating stem, said means being adjustable outside of said yoke.

2. In a device of the character described, in combination with a gas-valve stem and a stem opposed to said gas-valve stem and operating under varying water pressure, a yoke, a lever fulcrumed thereon and extending between said opposed stems, and tension means applied to said lever, said tension means being adjustable outside of said yoke.

3. In a device of the character described in combination with a gas valve-stem and a stem opposed thereto and movable under varying water pressures, a yoke, a lever fulcrumed thereon and extended between said stems, and adjustable tension means applied to one end of said lever, the adjustment of said tension means being effected outside of said yoke.

4. In a device of the character described, in combination with a gas-valve-stem and a stem opposed thereto and movable under varying water pressure, a lever having one end extended between said stems, a pivotal support for said lever, a tension means applied to the other end of said lever to impose a tension upon said water-pressure operating stem, and means outside of said pivotal support for adjusting said tension means.

In testimony whereof I have set my hand.

THOMAS F. CURRY.